(12) United States Patent
Ueno et al.

(10) Patent No.: US 11,283,815 B2
(45) Date of Patent: Mar. 22, 2022

(54) SECURITY MEASURE PROGRAM, FILE TRACKING METHOD, INFORMATION PROCESSING DEVICE, DISTRIBUTION DEVICE, AND MANAGEMENT DEVICE

(71) Applicant: NOMURA RESEARCH INSTITUTE, LTD., Tokyo (JP)

(72) Inventors: Masahiro Ueno, Tokyo (JP); Tianfeng Ma, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 15/678,487

(22) Filed: Aug. 16, 2017

(65) Prior Publication Data

US 2018/0091532 A1 Mar. 29, 2018

(30) Foreign Application Priority Data

Sep. 27, 2016 (JP) .............................. JP2016-188098

(51) Int. Cl.
*H04L 29/06* (2006.01)
*G06F 16/14* (2019.01)
(Continued)

(52) U.S. Cl.
CPC ........ *H04L 63/1416* (2013.01); *G06F 16/148* (2019.01); *G06F 16/951* (2019.01);
(Continued)

(58) Field of Classification Search
CPC ..... H04L 63/00; H04L 63/1416; H04L 67/06; G06F 12/00; G06F 21/564; G06F 16/951; G06F 2221/0737
See application file for complete search history.

(56) References Cited

U.S. PATENT DOCUMENTS 9,460,396 B1* 10/2016 Lee ........................... G06F 1/28
2005/0273858 A1* 12/2005 Zadok ..................... G06F 21/50
726/24

(Continued)

FOREIGN PATENT DOCUMENTS

JP 2011-010093 A 1/2011

OTHER PUBLICATIONS

European Search Report from European Patent Application No. 17191065.6, dated Oct. 23, 2017.
(Continued)

*Primary Examiner* — Joseph P Hirl
*Assistant Examiner* — Leynna Truvan
(74) *Attorney, Agent, or Firm* — Rankin, Hill & Clark LLP

(57) ABSTRACT

A collection and assignment unit collects attribute information for each file and assigns attribute information to a file to which attribute information is not assigned, when checking a file in a present information processing device. A reception unit receives attribute information of a tracking target file from a distribution device that distributes a pattern file. A search unit searches for a file associated with the attribute information of the tracking target file that is received. A transmission/procedure unit transmits, when there exists information regarding the file associated with the attribute information, the information regarding the file associated with the attribute information of the tracking target file to the distribution device and/or performs a procedure on the file.

19 Claims, 10 Drawing Sheets

(51) Int. Cl.
G06F 16/951 (2019.01)
G06F 21/16 (2013.01)
G06F 21/56 (2013.01)
H04L 67/06 (2022.01)

(52) U.S. Cl.
CPC ............ G06F 21/16 (2013.01); G06F 21/564 (2013.01); H04L 67/06 (2013.01); *G06F 2221/0737* (2013.01)

(56) References Cited

U.S. PATENT DOCUMENTS

| | | | |
|---|---|---|---|
| 2008/0172742 A1* | 7/2008 | Inoue | H04L 63/145 |
| | | | 726/24 |
| 2013/0227714 A1 | 8/2013 | Gula et al. | |
| 2014/0013434 A1 | 1/2014 | Ranum et al. | |
| 2014/0164255 A1* | 6/2014 | Daly | G06Q 50/188 |
| | | | 705/80 |
| 2015/0172300 A1* | 6/2015 | Cochenour | H04L 63/145 |
| | | | 726/23 |
| 2015/0269132 A1 | 9/2015 | Weisberger et al. | |
| 2015/0356282 A1 | 12/2015 | Heen et al. | |
| 2017/0093910 A1* | 3/2017 | Gukal | H04L 63/1425 |

OTHER PUBLICATIONS

Office Action Corresponding to EP Application No. 17191065.6 dated Feb. 21, 2020.
EPO Office Action for corresponding EP Application No. 17191065.6; dated Mar. 18, 2021.

* cited by examiner

FIG. 7A

| IDENTIFIER INFORMATION | | BASIC ATTRIBUTE INFORMATION | | | | |
|---|---|---|---|---|---|---|
| IDENTIFIER | IDENTIFIER ASSIGNMENT DATE AND TIME | FILE NAME | GENERATION DATE AND TIME | RECEPTION DATE AND TIME | LOCATION IN COMPUTER | SIZE |
| 00000···1 | XX/XX/XXXX XX:XX:XX | OOOO.doc | XX/XX/XXXX XX:XX:XX | XX/XX/XXXX XX:XX:XX | C:¥OOO¥OOO | OO.OKB |
| 00000···2 | XX/XX/XXXX XX:XX:XX | OOOO.jpg | XX/XX/XXXX XX:XX:XX | XX/XX/XXXX XX:XX:XX | C:¥OOO¥OOO | OO.OKB |
| 00000···3 | XX/XX/XXXX XX:XX:XX | OOOO.mp3 | XX/XX/XXXX XX:XX:XX | XX/XX/XXXX XX:XX:XX | C:¥OOO¥OOO | OO.OMB |
| ⋮ | ⋮ | ⋮ | ⋮ | ⋮ | ⋮ | ⋮ |

| COMPUTER INFORMATION | | | |
|---|---|---|---|
| COMPUTER TYPE | COMPUTER NAME | COMPUTER IP ADDRESS | COMPUTER DOMAIN |
| PC | OOOO | XXX.XXX. XXX.XXX | OOO.co.jp |

SECURITY MEASURE PROGRAM, FILE TRACKING METHOD, INFORMATION PROCESSING DEVICE, DISTRIBUTION DEVICE, AND MANAGEMENT DEVICE

BACKGROUND OF THE INVENTION

1. Field of the Invention

The present invention relates to a security measure program that protects a computer from the threat of computer virus, etc., a file tracking method, an information processing device, a distribution device, and a management device.

2. Description of the Related Art

In recent years, leakage of emails, SNS messages, image files, confidential document files, etc., to the Internet has become an issue. The leakage to the Internet occurs due to publication by mistake by a user, an unauthorized operation performed by somebody else, hacking, etc. Once an electronic file is leaked to the Internet, the file spreads to many unspecified users. Thus, it is difficult to specify and delete all the routes for the spreading in the present circumstances.

If information processing devices (PCs, servers, smartphones, tablets, etc.) all around the world that are connected to the Internet are installed with a common file tracking application, a leaked electronic file can be tracked. However, it is difficult to have dedicated software installed in the information processing devices all around the world.

The following Patent Document No. 1 suggests a system that controls the viewing, by a destination user, of the text of an email that has been transmitted. However, this is a technique that is limited to emails, and since it is necessary to store and accumulate the text of emails at a relay device, a large capacity storage is required.

Patent Document No. 1: Japanese Patent Application Publication NO. 2011-10093

SUMMARY OF THE INVENTION

In this background, a purpose of the present invention is to provide a technology for effectively using existing software resources installed in an information processing device so as to track an electronic file that has been leaked to a network.

A security measure program according to one embodiment of the present invention is embedded on a non-transitory computer-readable recording medium and includes: a collection and assignment process of collecting attribute information for each file and assigning attribute information to a file to which attribute information is not assigned, when checking a file in a computer; a reception process of receiving attribute information of a tracking target file from a distributor computer that distributes a pattern file for detecting a threat in the computer; a search process of searching for a file associated with the attribute information that is received; and a transmission/procedure process of transmitting, when there exists information regarding the file associated with the attribute information, the information regarding the file to the distributor computer and/or performing a procedure on the file.

Another embodiment of the present invention relates to a file tracking method. This method includes: collecting attribute information for each file and assigning attribute information to a file to which attribute information is not assigned, by a security measure program, when checking a file in a computer; transmitting, for a first time, a tracking request for a tracking target file to a distributor computer that distributes a pattern file; extracting, by the distributor computer, attribute information from the tracking target file that is received; transmitting, for a second time, the attribute information that is extracted to a computer in which the security measure program is installed; receiving, for a first time, the attribute information of the tracking target file by the security measure program of the computer; and searching, by the security measure program, for a file associated with the attribute information that is received.

Yet another embodiment of the present invention also relates to a file tracking method. This method includes: collecting attribute information for each file and assigning attribute information to a file to which attribute information is not assigned, by a security measure program, when checking a file in a computer; transmitting, for a first time, a tracking request for a tracking target file to a management computer; transmitting, for a second time, by the management computer the tracking request for the tracking target file to at least one distributor computer that distributes a pattern file; extracting, by the at least one distributor computer, attribute information from the tracking target file that is received; transmitting, for a third time, by the at least one distributor computer the attribute information that is extracted to a computer in which the security measure program is installed; receiving, for a first time, the attribute information of the tracking target file by each computer; and searching, by the security measure program of the computer, for a file associated with the attribute information of the file that is received.

Still another embodiment of the present invention relates to an information processing device. The device includes: a collection and assignment unit that collects attribute information for each file and assigns attribute information to a file to which attribute information is not assigned, when checking a file in the information processing device; a reception unit that receives attribute information of a tracking target file from a distribution device that distributes a pattern file for detecting a threat in the information processing device; a search unit that searches for a file associated with the attribute information that is received; and a transmission/procedure unit that transmits, when there exists information regarding the file associated with the attribute information, the information regarding the file associated with the attribute information to the distribution device, which is the distributor, and/or performs a procedure on the file.

Yet another embodiment of the present invention relates to a distribution device. This device is a distribution device that distributes a pattern file to the above-described information processing device and includes: a reception unit that receives a tracking request for a tracking target file; an extraction unit that extracts attribute information from the tracking target file that is received; and a transmission unit that transmits the attribute information that is extracted to the above-described information processing device.

Yet another embodiment of the present invention relates to a management device. This device includes: a reception unit that receives a tracking request for a tracking target file; and a transmission unit that transmits a tracking request for the tracking target file to the above-described distribution device of at least one distributor.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 7A and 7B are diagrams showing an example of associating information and an example of computer information, respectively;

DETAILED DESCRIPTION OF THE INVENTION

The invention will now be described by reference to the preferred embodiments. This does not intend to limit the scope of the present invention, but to exemplify the invention.

Figure 1:
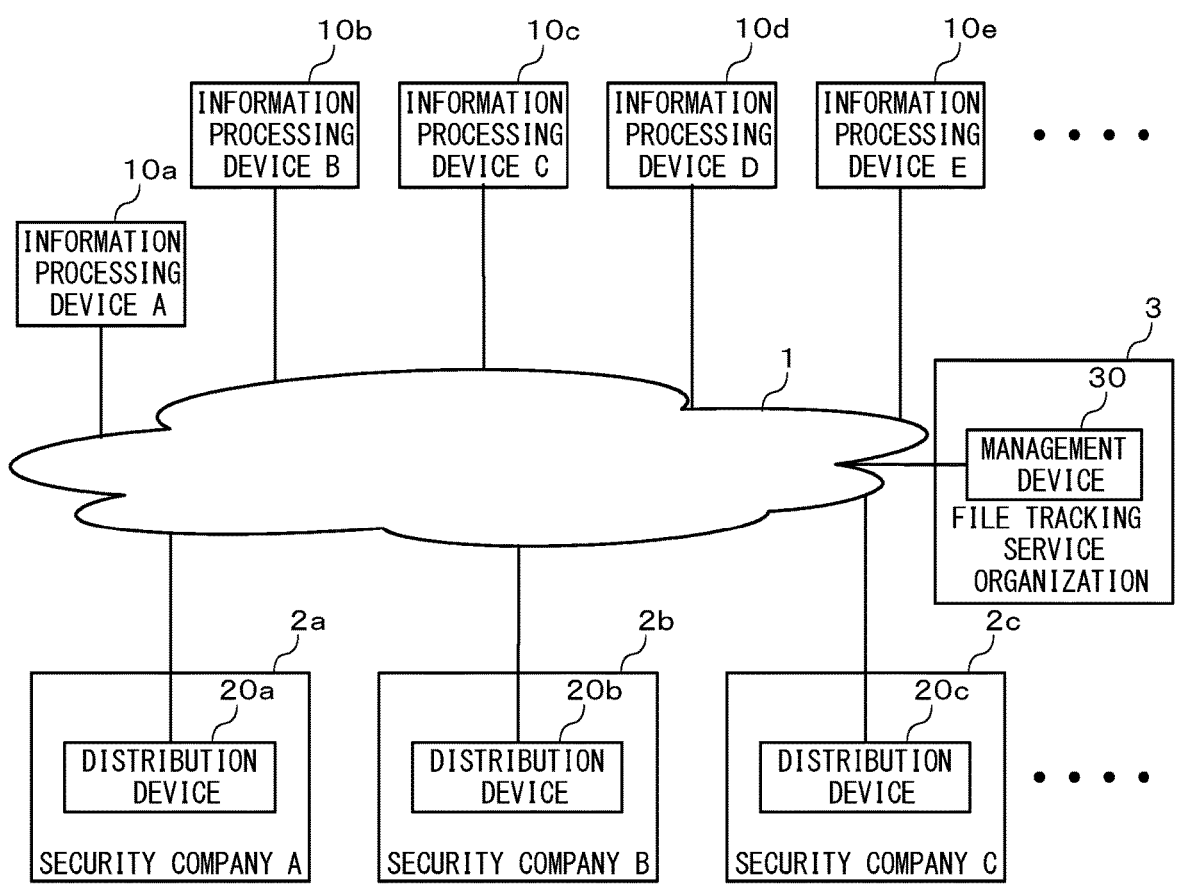
FIG. 1 is a system configuration diagram for explaining a file tracking method according to an embodiment of the present invention.

FIG. 1 is a system configuration diagram for explaining a file tracking method according to an embodiment of the present invention. To Internet 1, many information processing devices 10A-10E are connected. In the present embodiment, information processing devices 10 include all information processing devices that are installed with a security measure program, connected to the Internet 1, and provided with a recording medium for accumulating files. Mainly PCs, servers, smartphones, and tablets fall into this. As long as the above conditions are satisfied, the information processing devices 10 also include TV sets, set-top boxes, home-use game devices, head mounted displays, digital cameras, various household electrical appliances, land-line phones, faxes, intercoms, car navigation devices, portable music players, portable game devices, feature phones, etc. The Internet 1 is configured by the interconnection of a plurality of networks. However, in FIG. 1, the Internet 1 is drawn by a simplified model.

There are many malware applications on the Internet 1. Malware applications include viruses, worms, backdoors, Trojan horse, and spyware. Internet security suites that protect computers from such threats on the Internet 1 are sold by many security companies. Internet security suites mainly use antivirus software and include antispyware, firewall, etc.

A security measure program such as antivirus software detects a threat such as a virus or the like by mainly using a pattern matching method. In the pattern matching method, a threat is detected by the matching of a pattern file (also referred to as definition file) in which the features of a virus or the like are recorded and a file in an information processing device 10. A security company distributes, in order to keep a pattern file of the company's security measure program up-to-date, the pattern file or an updated file thereof to an information processing device 10 in which the company's security measure program is installed.

In FIG. 1, from a distribution device A20a of a security company A 2a, a distribution device B20b of a security company B 2b, and a distribution device C20c of a security company C 2c, respective pattern files are distributed to respective information processing devices 10 in which security measure programs of respective companies are installed.

In the present embodiment, using a security measure program installed in each information processing device 10, a file that has been leaked or has possibly been leaked from the information processing device 10 is tracked. A file tracking service organization 3 is an organization that provides file tracking services and may be led by a private company or a public organization. The file tracking service organization 3 is provided with a management device 30. The details of the management device 30 will be described later.

Figure 2:
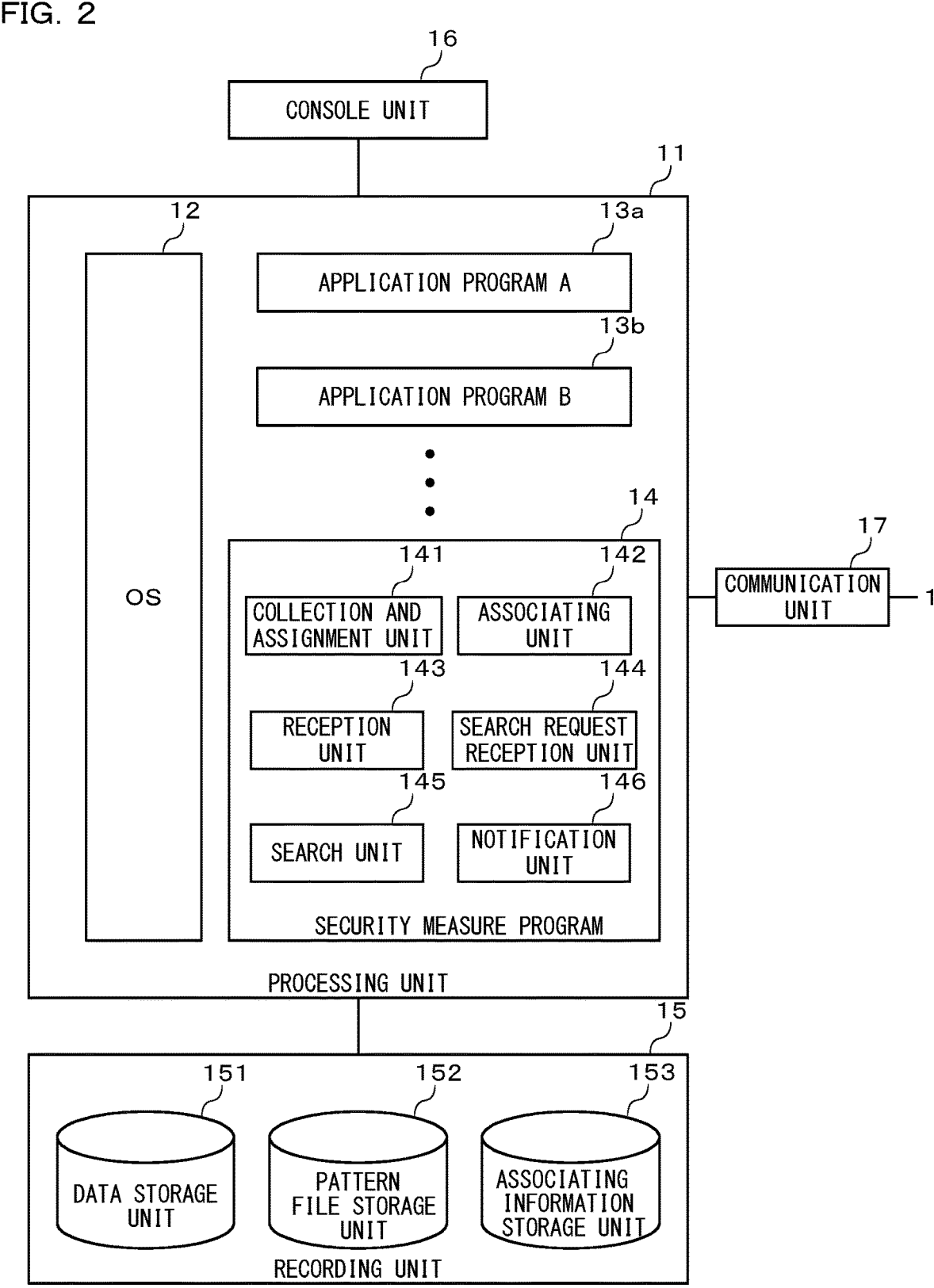
FIG. 2 is a block diagram showing the configuration of an information processing device of FIG. 1.

FIG. 2 is a block diagram showing the configuration of an information processing device 10 of FIG. 1. The information processing device 10 is provided with a processing unit 11, a recording unit 15, a console unit 16, and a communication unit 17. The processing unit 11 is achieved by the cooperation of hardware resources and software resources. As the hardware resources, various processors, ROM, RAM, and other LSI can be used. As the software resources, an operating system 12, an application program 13a, an application program 13b, . . . , and a security measure program 14 are used.

An application program 13 is an application program other than the security measure program 14, and various programs for browsers, emails, document preparation, spreadsheets, etc., fall into this.

The security measure program 14 includes a collection and assignment unit 141, an associating unit 142, a reception unit 143, a search request reception unit 144, a search unit 145, and a notification unit 146. The detailed operation of these functional blocks will be described later.

The recording unit 15 includes a non-volatile recording medium such as HDD, SSD, etc. Further, a removable recording medium such as an optical disk, USB memory, etc., also forms a part of the recording unit 15 when inserted into the drive. The recording unit 15 includes a data storage unit 151, a pattern file storage unit 152, and an associating information storage unit 153.

The data storage unit 151 stores the operating system 12, various programs such as the application program 13, and data used by the various programs. The pattern file storage unit 152 stores a pattern file referred to by the security measure program 14 during the execution of a check. The associating information storage unit 153 stores associating information generated by the security measure program 14.

The console unit 16 is a user interface including a display unit and an operation unit. The communication unit 17 performs a predetermined communication process for connecting to the Internet 1.

Figure 3:
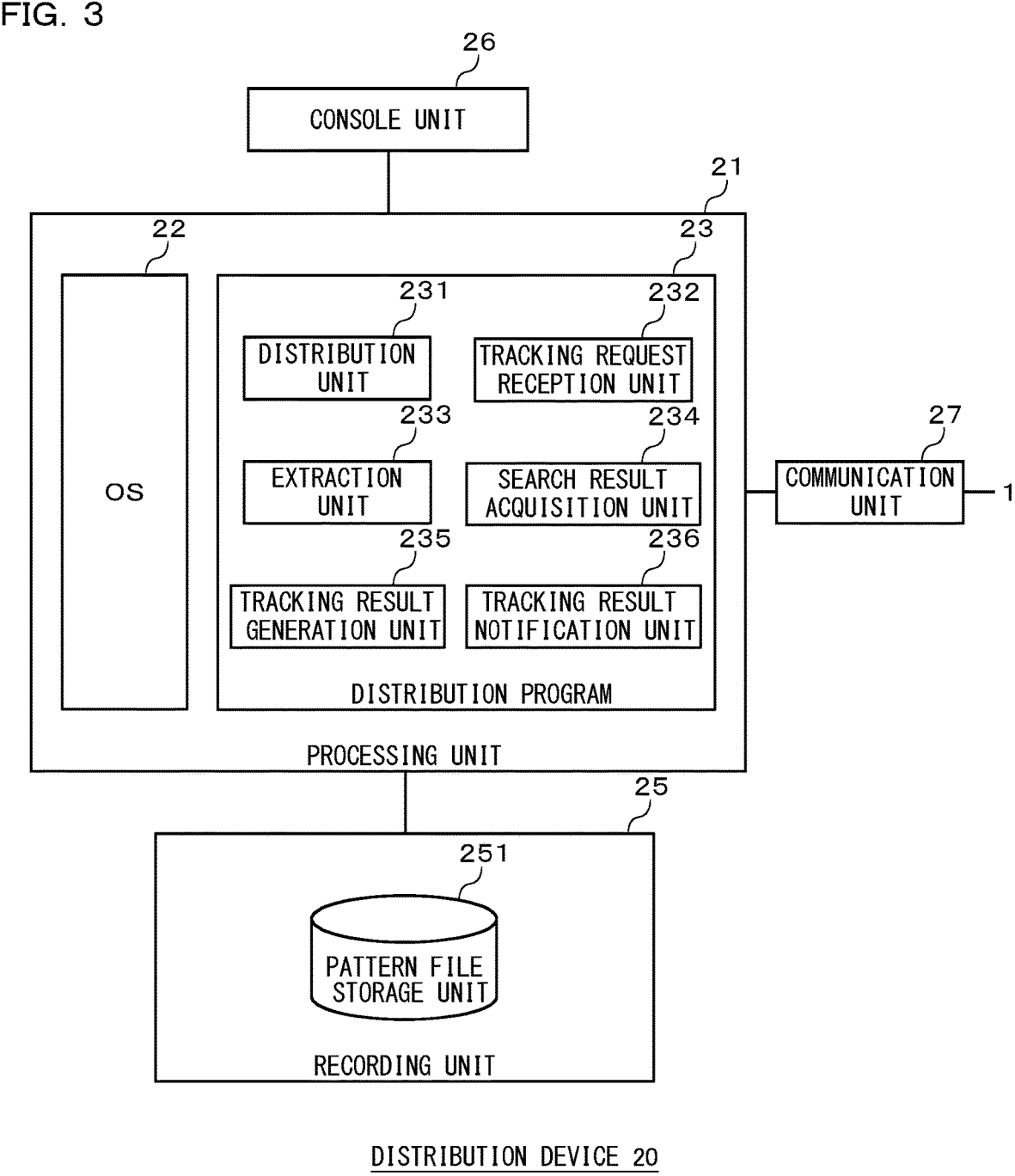
FIG. 3 is a block diagram showing the configuration of a distribution device of FIG. 1.

FIG. 3 is a block diagram showing the configuration of a distribution device 20 of FIG. 1. The distribution device 20 consists of a plurality of servers. A distribution system may be configured by the cloud connection of servers installed at multiple locations.

The distribution device 20 is provided with a processing unit 21, a recording unit 25, a console unit 26, and a communication unit 27. The processing unit 21 is achieved by the cooperation of hardware resources and software resources. As the software resources, an operating system 22 and a distribution program 23 are used. In the illustration of FIG. 3, application programs other than the distribution program 23 are omitted.

The distribution program 23 includes a distribution unit 231, a tracking request reception unit 232, an extraction unit 233, a search result acquisition unit 234, a tracking result generation unit 235, and a tracking result notification unit 236. The detailed operation of these functional blocks will be described later.

The recording unit 25 includes a pattern file storage unit 251. A pattern file stored in the pattern file storage unit 251 is a master file of a pattern file stored in the pattern file storage unit 152 of an information processing device 10 in which a security measure program 14 of the same company is installed.

Figure 4:
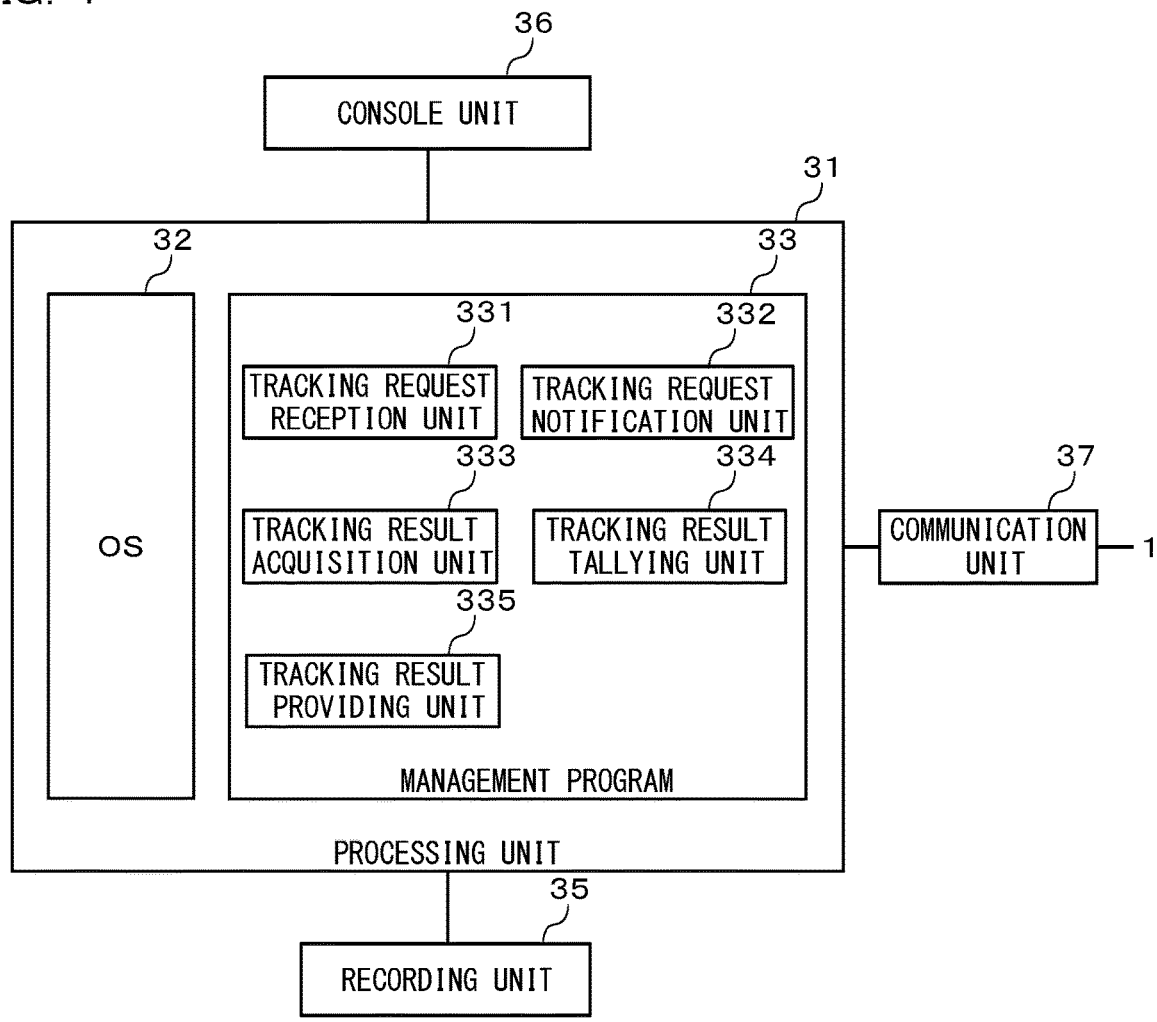
FIG. 4 is a block diagram showing the configuration of a management device of FIG. 1.

FIG. 4 is a block diagram showing the configuration of the management device 30 of FIG. 1. The management device 30 also consists of a plurality of servers. A management system may be formed by the cloud connection of servers installed at multiple locations.

The management device 30 is provided with a processing unit 31, a recording unit 35, a console unit 36, and a communication unit 37. The processing unit 31 is achieved by the cooperation of hardware resources and software resources. As the software resources, an operating system 32 and a management program 33 are used. In the illustration of FIG. 3, application programs other than the management program 33 are omitted.

The management program 33 includes a tracking request reception unit 331, a tracking request notification unit 332, a tracking result acquisition unit 333, a tracking result tallying unit 334, and a tracking result providing unit 335. The detailed operation of these functional blocks will be described later.

Figure 5:
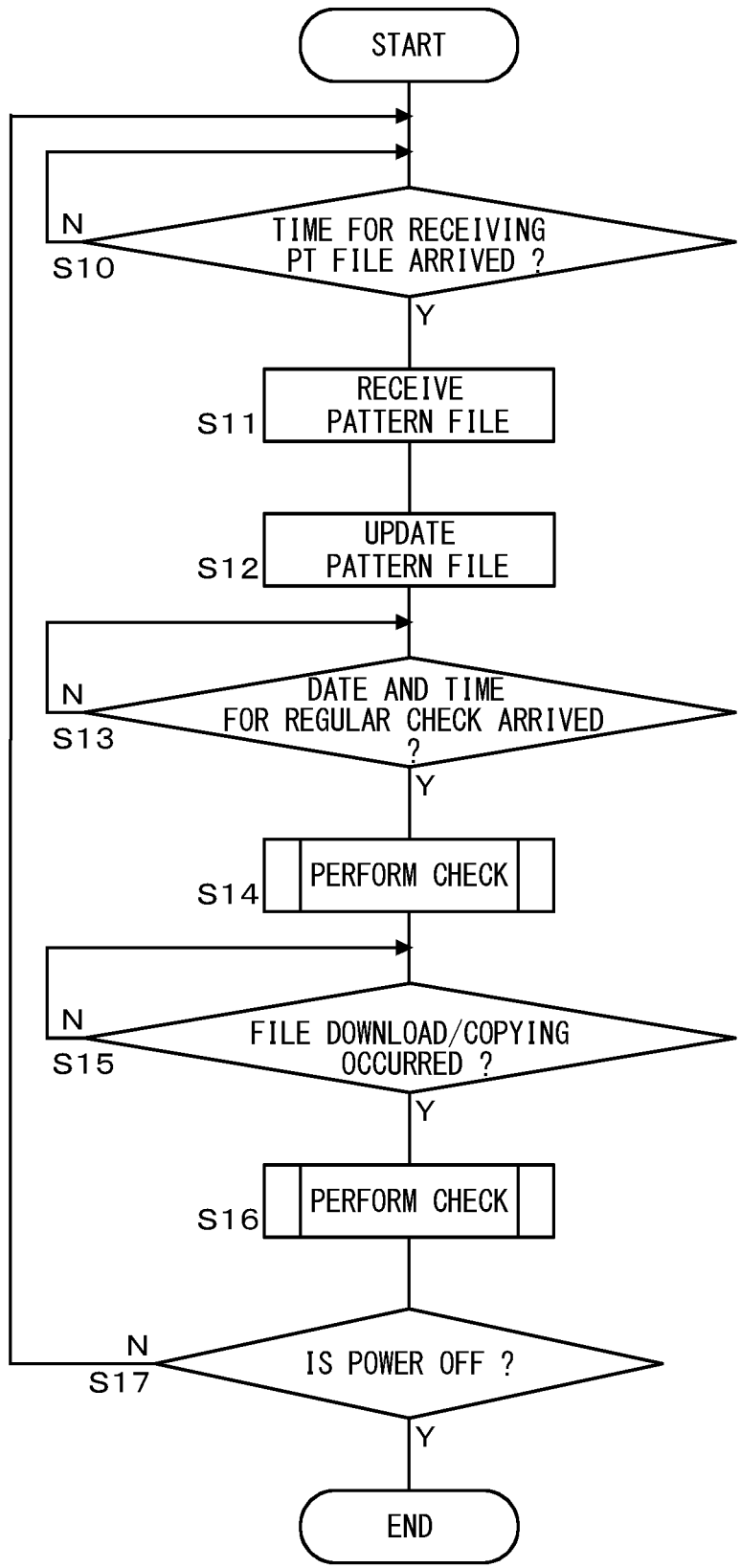
FIG. 5 is a flowchart for explaining the basic operation of the information processing device.

FIG. 5 is a flowchart for explaining the basic operation of the information processing device 10. When a time arrives for receiving a pattern file (Y in S10), the security measure program 14 of the information processing device 10 receives a pattern file or an updated file thereof that is distributed from the distribution device 20 (S11). The security measure program 14 updates, based on the pattern file or the updated file thereof the security measure program 14 received, updates a pattern file in the pattern file storage unit 251 to the latest version (S12).

Normally, the pattern file is updated once a day at a set time. If a virus or the like that is highly urgent is found, pattern data thereof is distributed regardless of the regular time of receipt.

When a date and time for a regular check by the security measure program 14 arrive (Y in S13), the security measure program 14 performs a regular check (S14). The regular check is performed at a frequency of, for example, once a day or once a week. The date and time for performing the regular check can be set by the user. In the regular check, all the files recorded in the recording unit 15 are basically subject to checking. When the range of the checking is specified by the user, files in the range are subject to checking.

The security measure program 14 is resident in the memory and performs real-time monitoring. For example, when a new file is downloaded in the information processing device 10 or when a file is copied (Y in S15), the security measure program 14 performs the checking of the file (S16). The processes in steps S10 to S16 explained above are repeatedly performed while the power of the information processing device 10 is on (N in S17).

Regarding the above-described regular check and a real-time check, at least one of the checks needs to be performed, and it is not necessary to perform both checks. Although not shown in FIG. 5, a file check may be performed resulting from the user operation.

Figure 6:
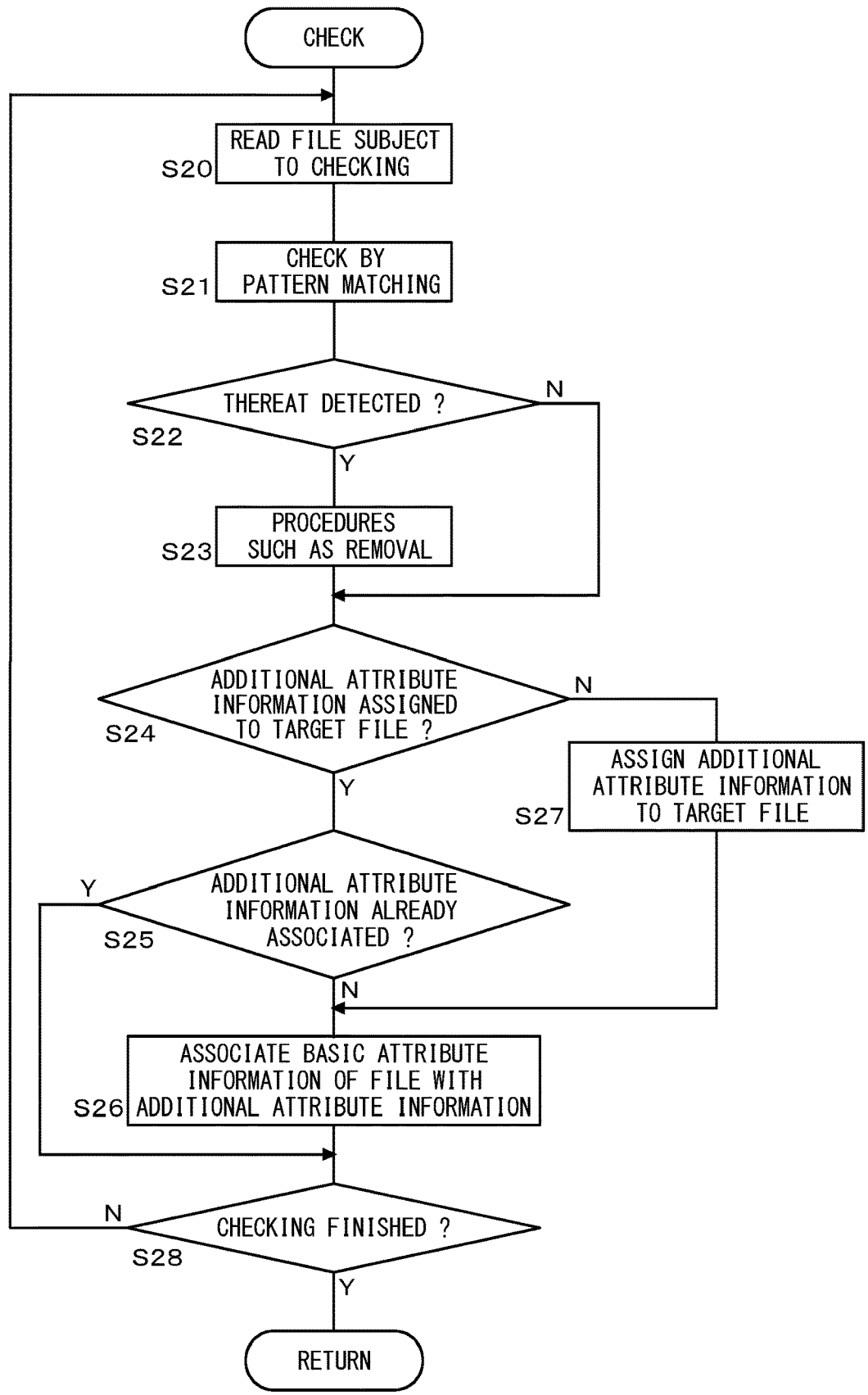
FIG. 6 is a flowchart for explaining the operation of the information processing device during the execution of a check.

FIG. 6 is a flowchart for explaining the operation of the information processing device 10 during the execution of the checking. During the execution of the checking, the security measure program 14 reads a file subject to checking (S20). The security measure program 14 checks, by pattern matching, whether a signature code of a virus or the like registered in the pattern file is included in the file subject to checking (S21). When a threat such as a virus or the like is detected in the file subject to checking (Y in S22), the security measure program 14 performs procedures such as removal, isolation, or the like of a target code (S23). When no threat is detected in the file subject to checking (N in S22), the process of step S23 is skipped.

The collection and assignment unit 141 of the security measure program 14 determines whether or not additional attribute information for uniquely identifying the file subject to checking is assigned to the file (S24). Of attribute information other than information regarding the content of the file, the additional attribute information is attribute information that is added afterwards, separately from basic attribute information. The basic attribute information is attribute information such as a file name, a file type, a size, a generation date and time, etc., that is assigned at the time of the generation, the updating, or the like of the file. The additional attribute information is attribute information that is assigned afterwards by the security measure program 14. As the additional attribute information, for example, an identifier, feature information, and environmental information can be used. When an identifier is used, an identifier that is assigned to the file can be, for example, defined by an identification number such as XX:XX:XX:XX:XX:XX:XX:XX:XX:XX:XX:XX (X is a hexadecimal number). For example, the first XX indicates the ID of a security company, the next XX indicates the ID of the type of security software of each security company, and the following XX:XX indicates the serial ID of each security software. The last XX:XX:XX:XX:XX:XX:XX:XX indicates a serial ID assigned to each security software that can be assigned to the file. This rule for the identification number is intended to be an example and is not limiting.

The feature information is, for example, information for identifying the file such as MD5 hash value of the file, random data of a given bit to another bit of the file, and the like. When an identifier is assigned to the file, the identifier can be used. However, in the case of a file that is not assigned with an identifier, feature information such as the one described above can be used.

The environmental information is information that indicates in which folder of a PC of which domain and from what time to what time the file exists or had existed, the owner and the IP address of the PC, the creator or amender of the file, etc., and is, particularly, information that can be effectively used at the time of file tracking.

When associating information is not assigned to the file subject to checking (N in S24), the collection and assignment unit 141 assigns additional attribute information to the file subject to checking (S27). The collection and assignment unit 141, for example, embeds a digital watermark into the file subject to checking as additional attribute information. Digital watermarking is a technique for embedding information that cannot be perceived by a human being into a stationary image file, a moving image file, and/or an audio file. Methods for embedding a digital watermark include, for example, a substitution method, a frequency domain conversion method, a diffusion method, a statistical method, and a vector quantization method. Basically, the algorithm for a digital watermark is not disclosed.

For a document file, the collection and assignment unit 141 embeds additional attribute information in the margin of a text. The information is desirably embedded at a position that will not be edited by the user at that time. Also, the additional attribute information may be embedded while dispersing the information in a plurality of parts in the margin. The method for assigning attribute information by the collection and assignment unit 141 is not limited to digital watermarking. For example, an area for embedding additional attribute information may be set in a header area or a footer area of a file, and the additional attribute information may be embedded in the area. The associating unit 142 associates the basic attribute information of the file subject to checking to which the additional attribute information is assigned with the additional attribute information and registers the associating information in the associating information storage unit 153 (S26).

When the additional attribute information is already assigned to the file subject to checking (Y in S24), the associating unit 142 checks whether or not the basic attribute information and the additional attribute information of the file subject to checking are already associated with each other (S25). When the basic attribute information and the additional attribute information are not associated with each other (N in S25), the associating unit 142 associates the basic attribute information of the file subject to checking with the additional attribute information and registers the associating information in the associating information storage unit 153 (S26). For example, when a file to which additional attribute information is assigned is downloaded from another information processing device 10, the processes in step S26 are performed. When the basic attribute information and the additional attribute information of the file subject to checking are already associated with each other, (Y in S25), the processes in step S26 are skipped.

The processes in steps S20 to S27 explained above are repeatedly performed until the checking is finished (N in S28). In the case of a regular check, the processes are repeatedly performed until the checking of all files subject to checking is finished.

FIGS. 7A and 7B are diagrams showing an example of associating information and an example of computer information, respectively. The associating information shown in FIG. 7A shows an example where an identifier and the basic attribute information of a file are associated with each other and listed. In the example shown in FIG. 7A, identifier information includes an identifier and identifier assignment date and time. When an identifier is assigned by the collection and assignment unit 141 of the information processing device 10, the date and time of the assignment is registered. The assignment date and time of an identifier assigned by another information processing device 10 is registered if the assignment date and time is embedded in the file and is left blank if the assignment date and time is not embedded.

In the example shown in FIG. 7A, the basic attribute information of a file includes a file name, a generation date and time, a reception date and time, a location in a computer (a path to a folder), and a size. Although not shown, other information may be further included in the basic attribute information of a file such as an update date and time, a last access date and time, etc.

In an example shown in FIG. 7B, computer information includes a computer type, a computer name, an IP address, and a domain. The computer information is added as supplementary information when the distribution device 20 is notified of the identification information and the basic attribute information of a file. The process will be described in detail hereinafter.

Figure 8:
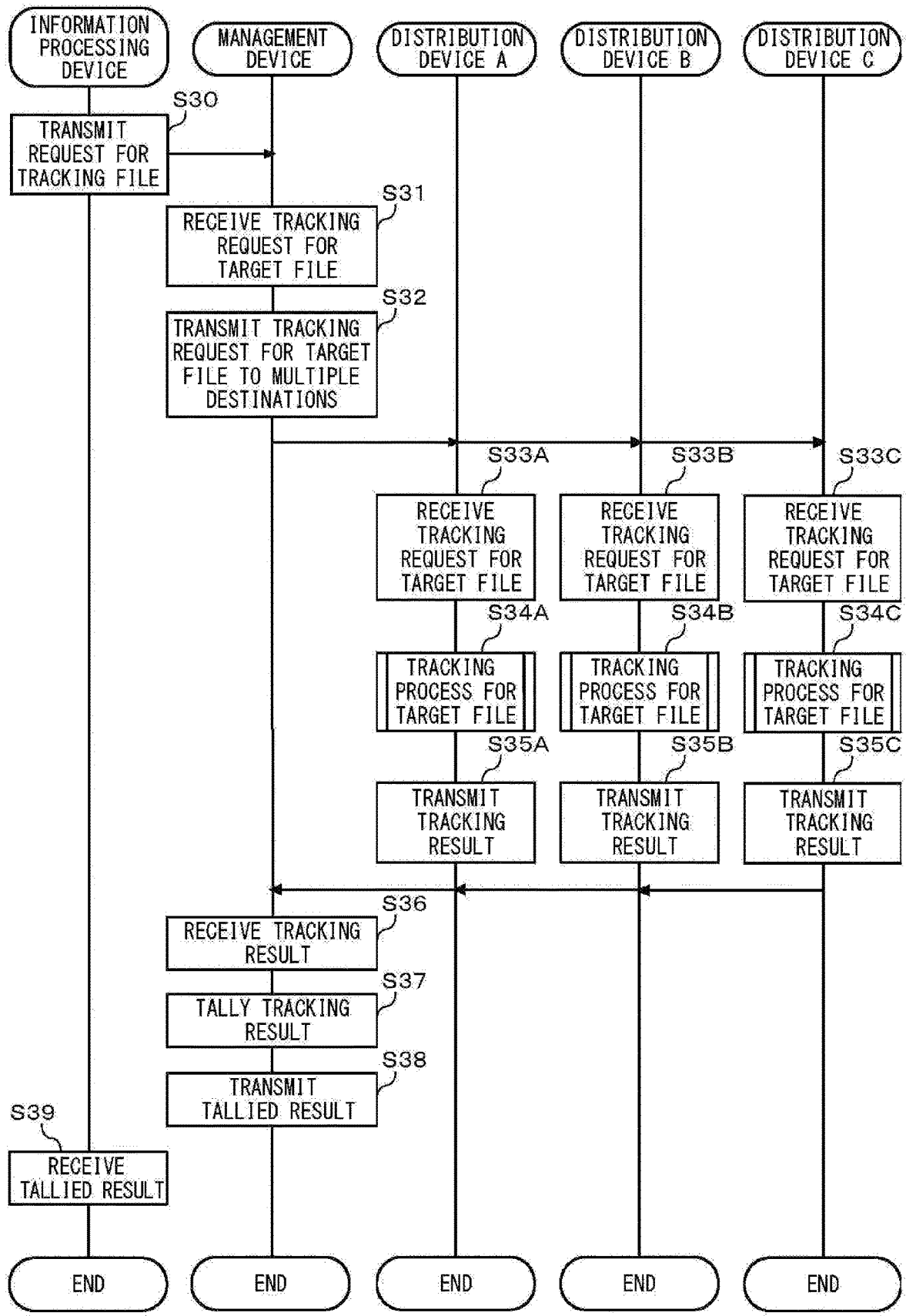
FIG. 8 is a flowchart showing the basic flow of a file tracking method.

FIG. 8 is a flowchart showing the basic flow of a file tracking method. One information processing device 10 transmits, via the Internet 1, a request for tracking a file that has been leaked or has possibly been leaked from the information processing device 10 to the management device 30 (S30). For example, the user of the information processing device 10 operates the console unit 16 so as to select a file for which tracking is requested, and the information processing device 10 transmits the file that is selected to the management device 30. It is assumed that additional attribute information is assigned to the file for which tracking is requested. The information processing device 10 from which the file has been leaked may be different from an information processing device 10 that transmits a tracking request.

The tracking request reception unit 331 of the management device 30 receives a tracking request for a target file transmitted from the information processing device 10 (S31). The tracking request notification unit 332 transmits, via the Internet 1, the tracking request for the target file to multiple destinations: distribution devices 20a to 20c of a plurality of security companies 2A to 2C (S32).

A tracking request reception unit 232 of each of the distribution devices 20a to 20c receives the tracking request for the target file transmitted from the information processing management device 30 (S33A-33C). Each of the distribution devices 20a to 20c performs a tracking process for the target file that is received (S34A-34C). The tracking process will be described in detail hereinafter. A tracking result notification unit 236 of each of the distribution devices 20a to 20c transmits, via the Internet 1, the result of the tracking process for the target file to the management device 30 (S35A-35C).

The tracking result acquisition unit 333 of the management device 30 receives the tracking result for the target file transmitted from the plurality of distribution devices 20a to 20c (S36). The tracking result tallying unit 334 of the management device 30 tallies the tracking result for the target file transmitted from the plurality of distribution devices 20a to 20c (S37). The tracking result providing unit 335 of the management device 30 transmits, via the Internet 1, the tallied result of the tracking result for the target file to the information processing device 10 of the origin of the request (S38). The information processing device 10 of the request origin receives the tallied result (S39).

Figure 9:
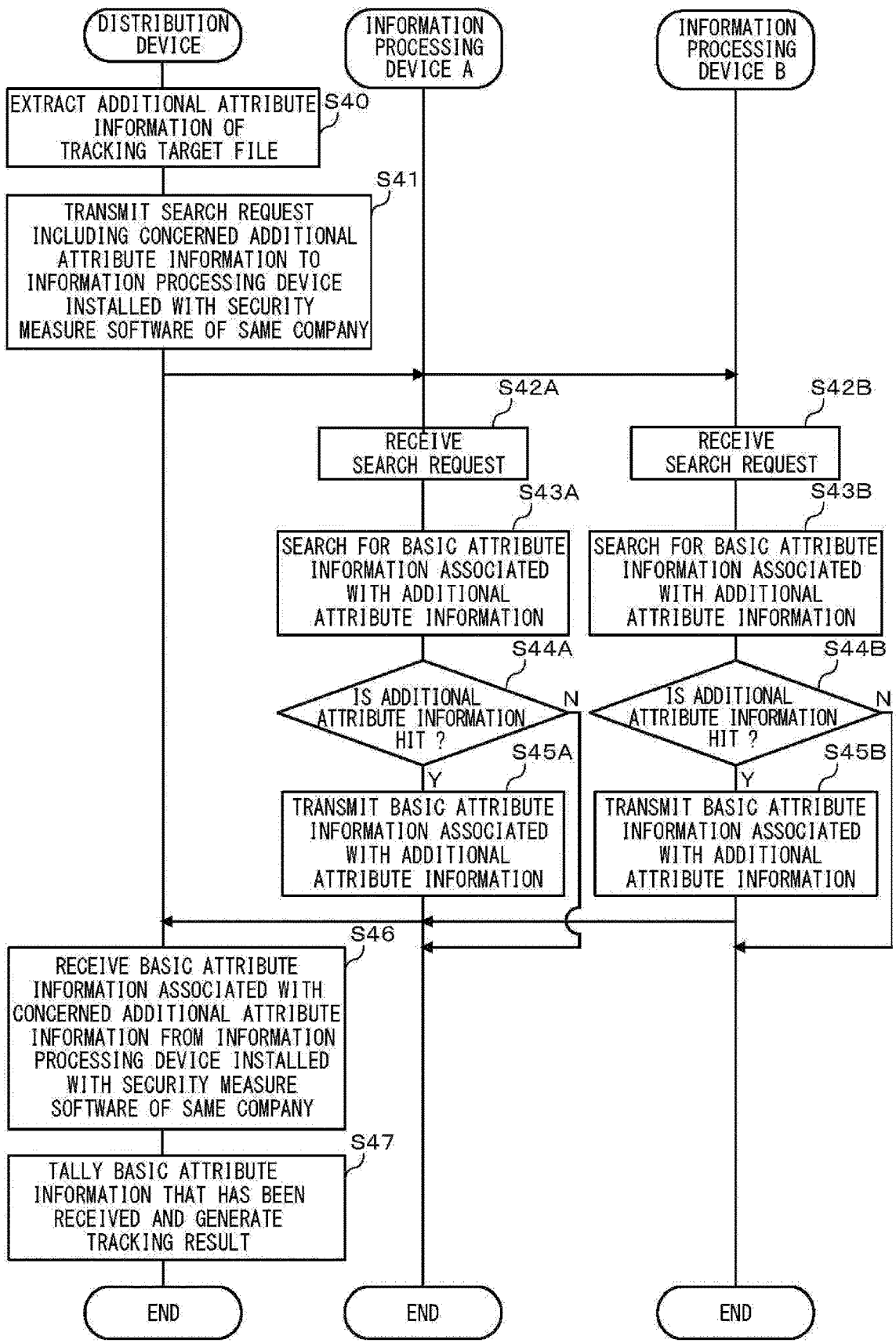
FIG. 9 is a flowchart for explaining the details of a file tracking process performed by the distribution device.

FIG. 9 is a flowchart for explaining the details of a file tracking process performed by the distribution device 20. The extraction unit 233 of the distribution device 20 extracts the additional attribute information of the target file received from the management device 30 (S40). The distribution unit 231 of the distribution device 20 transmits, via the Internet 1, a search request for the target file including the additional attribute information that has been extracted to each of a plurality of information processing devices 10 in which a security measure program of the same company is installed (S41).

The distribution unit 231 distributes the search request in a path that is the same as that for regular pattern file distribution. This search request may be distributed at the time of the regular pattern file distribution or may be distributed at a time different from the regular pattern file distribution. For example, the distribution unit 231 distributes a search request of high urgency immediately after receiving a tracking request from the management device 30 and distributes a search request of low urgency at the time of the regular pattern file distribution.

The search request reception unit 144 of the information processing device 10 receives a search request for a tracking target file from the distribution device 20 (S42A, S42B). The search unit 145 of the information processing device 10 searches for the basic attribute information of the file that is associated with the additional attribute information of the tracking target file that is received (S43A, S43B). The notification unit 146 may transmit, instead of transmitting the attribute information of the file such as a file name, a generation date and time, etc., information only indicating that the tracking target file exists. In this case, the communication load can be minimized. When the additional attribute information is hit (Y in S44A, S44B), the notification unit 146 of the information processing device 10 transmits, via the Internet 1, the basic attribute information of the file associated with the additional attribute information that is hit and the computer information to the distribution device 20 (S45A, S45B). When the additional attribute information is not hit (N in S44A, S44B), the processes in steps S45A and S45B are skipped.

The search result acquisition unit 234 of the distribution device 20 receives the basic attribute information of the file associated with the additional attribute information of the tracking target file and the computer information from the information processing device 10 in which a security measure program of the same company is installed (S46). The tracking result generation unit 235 of the distribution device 20 tallies the basic attribute information of the file and the computer information that have been received and generates the tracking result for the target file (S47).

Based on FIGS. 8 and 9, an explanation has been made regarding the basic operation of the file tracking process in the above. An application example thereof will be described in the following. For example, when transmitting the tracking request from the information processing device 10 of the origin of the file tracking request to the management device 30, a search range for the file can be specified. For example, at least one of a region, a group, an organization, an IP address, a domain name, a computer type (PC, server, smartphone, etc.) can be specified. The distribution unit 231 of the distribution device 20 transmits the search request for the file to an information processing device 10, in which a security measure program 14 of the same company is installed, in a specified range. At that time, the distribution unit 231 can determine an information processing device 10 for which the search request is to be distributed, based on information regarding an information processing device 10 that is associated with the license number or registration information of the security measure program 14.

Also, when transmitting the tracking request from the information processing device 10 of the origin of the file tracking request to the management device 30, procedures for when the target file is detected can be specified. For example, procedures such as deletion, isolation, prohibition of duplication and transferring, or prohibition of accessing of the target file can be specified. In the case of a request for only checking whether or not there is a leakage, it is not necessary to specify a procedure. Further, a procedure can be specified for each range, e.g., specifying a target file to be deleted only for a specified range, specifying a target file to be not deleted only for a specified range, and so on.

Figure 10:
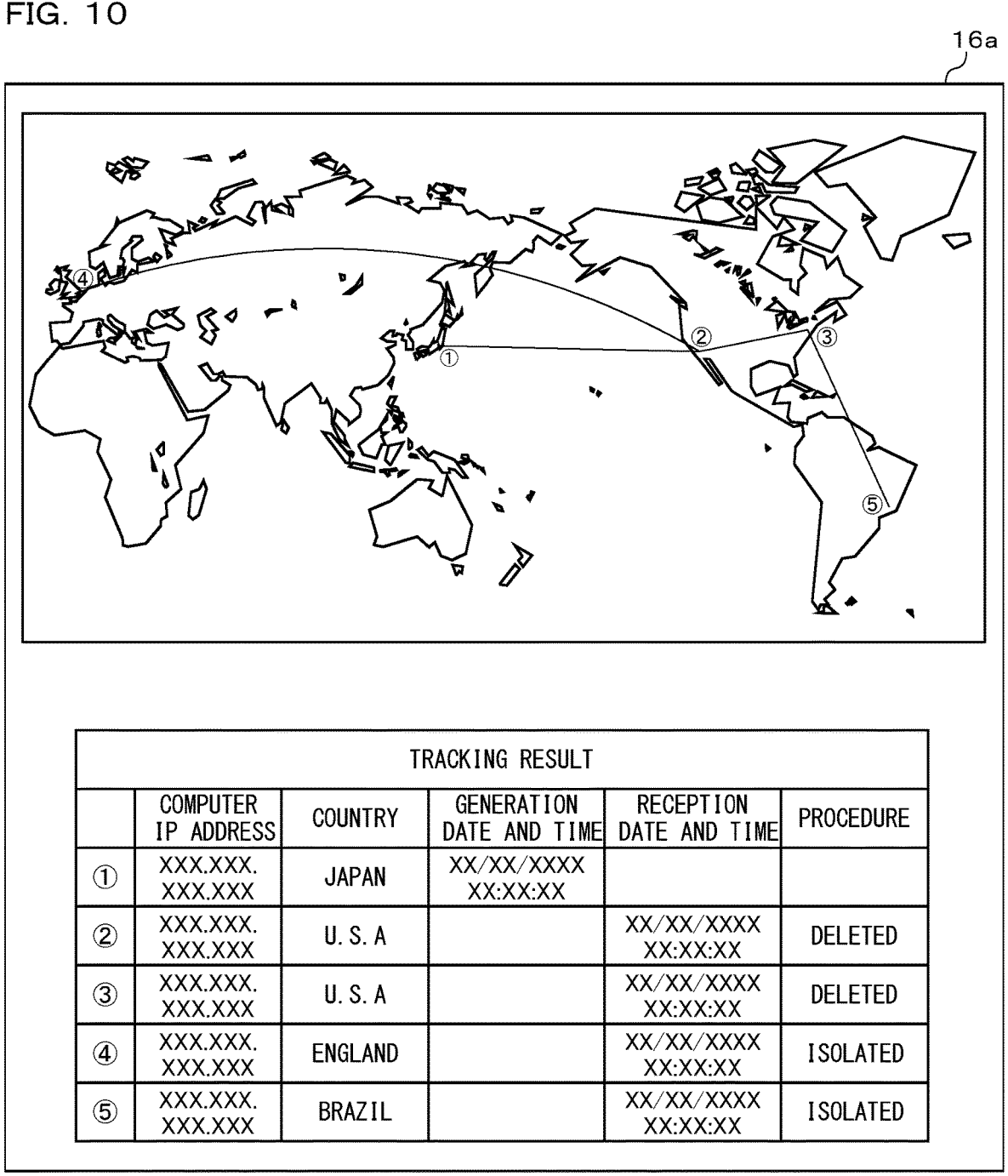
FIG. 10 is a diagram showing an example of a display screen for a file tracking result.

FIG. 10 is a diagram showing an example of a display screen 16a for a file tracking result. The tracking result shown in FIG. 10 shows that a file leaked from an information processing device 10 in Tokyo has been forwarded to an information processing device 10 in Los Angeles, spread from the information processing device 10 in Los Angeles to information processing devices 10 in New York and London, and forwarded from the information processing device 10 in New York to an information processing device 10 in Rio de Janeiro.

Also, the information processing device 10 of the origin of the file tracking request can specify the range for displaying the tracking result of the file. For example, only the behavior of the target file within a specified period can be displayed. Also, only the behavior of the target file within a specified region can be displayed. Further, the file can be checked in spots by specifying a specific time, location, or organization. Also, the behavior of the target file can be monitored in real time. Note that only a target file in an information processing device 10 where a security measure program 14 is resident in the memory and performs real-time monitoring is subject to real-time monitoring.

As explained in the above, according to the present embodiment, by using a security measure program 14 installed in an information processing device 10, an electronic file that has been leaked to the Internet 1 can be tracked. Moreover, a procedure such as deletion and so on can be also performed. Many PCs and servers are installed with security measure programs, and each security company regularly distributes a pattern file to its own security measure program. In the present embodiment, a file for which a tracking request has been received is searched for by effectively using this existing infrastructure. Therefore, a file tracking method according to the present embodiment can be realized with low additional costs.

Also, by installing a management device 30, complicated operations for transmitting a file tracking request to a plurality of security companies can be simplified into a single operation. Further, a task of tallying tracking results, after the tracking results are returned separately from the plurality of security companies, on its own can be omitted.

Described above is an explanation of the present invention based on the several embodiments. These embodiments are intended to be illustrative only, and it will be obvious to those skilled in the art that various modifications to constituting elements and processes could be developed and that such modifications are also within the scope of the present invention.

In the above-described embodiment, an example where the management device 30 is provided has been explained. However, the management device 30 is not necessary and can be omitted. In that case, the information processing device 10 of the origin of the file tracking request transmits the file tracking request to each of respective distribution devices 20 of a plurality of security companies 2.

Also in the above-described embodiment, an information processing device 10 that has detected the target file in response to the file tracking request is required to transmit a tracking result to the origin of the request. However, the information processing device 10 may perform only a procedure such as the deletion of the target file without transmitting the tracking result.

What is claimed is:

1. A non-transitory computer-readable recording medium having embodied thereon a pattern matching file check program comprising computer executable instructions, the pattern matching file check program being installed in a computer and, when executed by the computer, causing the computer to perform:
  a collection and assignment process in which said pattern matching file check program collects attribute information for uniquely identifying each file subject to checking, which has been assigned by the pattern matching file check program, from each file and simultaneously assigns the attribute information to a file to which no attribute information has been assigned by the pattern matching file check program, while said pattern matching file check program is detecting whether a threat such as a virus is present in the file subject to checking;
  a reception process of receiving the attribute information of a tracking target file from a distributor computer that distributes a pattern file for detecting the threat in the computer;
  a search process of searching for a file associated with the attribute information of the tracking target file that is received; and
  a transmission/procedure process of transmitting, when there exists information regarding the file associated with the attribute information of the tracking target file, the information regarding the file associated with the attribute information of the tracking target file to the distributor computer and/or performing a procedure on the file associated with the attribute information of the tracking target file.

2. The non-transitory computer-readable recording medium having embodied thereon the pattern matching file check program according to claim 1, wherein a digital watermark is embedded into the file as the attribute information in the collection and assignment process.

3. A file tracking method comprising:
  collecting attribute information for uniquely identifying each file subject to checking, which has been assigned by a pattern matching file check program, from each file and simultaneously assigning, by the pattern matching file check program, the attribute information to a file to which no attribute information has been assigned by the pattern matching file check program, while the pattern matching file check program is checking a file in a computer for detecting whether a threat such as a virus is present in the file by using a pattern matching method by matching a pattern file with the file subject to checking, said pattern matching file check program being installed in the computer;
  transmitting, for a first time, a tracking request for a tracking target file to a distributor computer that distributes the pattern file for detecting the threat;
  extracting, by the distributor computer, the attribute information from the tracking target file that is received;
  transmitting, for a second time, the attribute information that is extracted to a computer in which the pattern matching file check program is installed;
  receiving, for a first time, the attribute information of the tracking target file by the pattern matching file check program of the computer; and
  searching, by the pattern matching file check program, for a file associated with the attribute information of the tracking target file that is received.

4. The file tracking method according to claim 3, further comprising:
  when there exists information regarding the file associated with the attribute information of the tracking target file, transmitting, for a third time, the information regarding the file associated with the attribute information of the tracking target file to the distributor computer; and
  generating, by the distributor computer, a tracking result of the tracking target file based on information from the computer in which the pattern matching file check program is installed.

5. The file tracking method according to claim 3,
  wherein the transmitting for a first time includes transmitting a tracking request including the range of a computer to be searched to the distributor computer, and
  wherein the transmitting for a second time includes transmitting the attribute information extracted from the tracking target file to a computer in the range that is specified, which is included in the tracking request.

6. A file tracking method comprising:
  collecting attribute information for uniquely identifying each file subject to checking, which has been assigned by a pattern matching file check program, from each file and simultaneously assigning, by the pattern matching file check program, the attribute information to a file to which has no attribute information has been assigned by the pattern matching file check program, while the pattern matching file check program is checking a file in a computer for detecting whether a threat such as a virus is present in the file by using a pattern matching method by matching a pattern file with the file subject to checking, said pattern matching file check program being installed in the computer;
  transmitting, for a first time, a tracking request for a tracking target file to a management computer;
  transmitting, for a second time, by the management computer, the tracking request for the tracking target file to at least one distributor computer that distributes the pattern file for detecting the threat;
  extracting, by the at least one distributor computer, the attribute information from the tracking target file that is received;
  transmitting, for a third time, by the at least one distributor computer, the attribute information that is extracted to a computer in which the pattern matching file check program is installed;
  receiving, for a first time, the attribute information of the tracking target file by each computer; and
  searching, by the pattern matching file check program of the computer, for a file associated with the attribute information of the tracking target file that is received.

7. The file tracking method according to claim 6, further comprising:
  when there exists information regarding the file associated with the attribute information of the tracking target file, transmitting, for a fourth time, the information regarding the file associated with the attribute information of the tracking target file to a computer of the transmission origin of the attribute information;
  generating, by each distributor computer, a tracking result of the tracking target file based on information from the computer in which the pattern matching file check program is installed;
  transmitting, for a fifth time, by the distributor computer, the tracking result of the tracking target file to the management computer; and collecting, by the management computer, the tracking result received from the at least one distributor computer so as to tally the tracking result.

8. The file tracking method according to claim 6,
wherein the transmitting for a first time includes transmitting a tracking request including the range of a computer to be searched to the management computer, and
wherein the transmitting for a third time includes transmitting the attribute information extracted from the tracking target file to a computer in the range that is specified, which is included in the tracking request.

9. The file tracking method according to claim 3, further comprising:
performing, when there exists information regarding the file associated with the attribute information of the tracking target file, a procedure of deletion, isolation, prohibition of duplication and transferring, or prohibition of accessing of the file associated with the attribute information of the tracking target file in the computer by the pattern matching file check program.

10. An information processing device comprising:
a processor, which is configured to:
collect attribute information for uniquely identifying each file subject to checking, which has been assigned by a pattern matching file check program, from each file and simultaneously assign the attribute information to a file to which no attribute information is assigned by the pattern matching file check program, while the pattern matching file check program is checking a file in the information processing device for detecting whether a threat such as a virus is present in the file by using a pattern matching method by matching a pattern file with the file subject to checking, said pattern matching file check program being installed in the information processing device;
receive the attribute information of a tracking target file from a distribution device that distributes the pattern file for detecting the threat in the information processing device;
search for a file associated with the attribute information of the tracking target file that is received; and
transmit, when there exists information regarding the file associated with the attribute information of the tracking target file, the information regarding the file associated with the attribute information of the tracking target file to the distribution device, which is the distributor, and/or perform a procedure on the file associated with the attribute information of the tracking target file.

11. A distribution device that distributes a pattern file to an information processing device, comprising:
a processor, which is configured to:
receive a tracking request for a tracking target file;
extract attribute information, which has been assigned by a pattern matching file check program in the information processing device, from the tracking target file that is received, the attribute information uniquely identifying the tracking target file on an interne; and
transmit the attribute information that is extracted to the information processing device;
wherein the information processing device comprises:
a processor, which is configured to:
collect the attribute information which has been assigned by the pattern matching file check program from each file and simultaneously assign, by the pattern matching file check program, the attribute information to a file to which no attribute information has been assigned by the pattern matching file check program, while the pattern matching file check program is checking a file in the information processing device for detecting whether a threat such as a virus is present in the file by using a pattern matching method by matching the pattern file with the file subject to checking;
receive the attribute information of the tracking target file from the distribution device that distributes the pattern file for detecting the threat in the information processing device;
search for a file associated with the attribute information of the tracking target file that is received; and
transmit, when there exists information regarding the file associated with the attribute information of the tracking target file, the information regarding the file associated with the attribute information of the tracking target file to the distribution device, which is the distributor, and/or perform a procedure on the file associated with the attribute information of the tracking target file.

12. The distribution device according to claim 11,
wherein the processor of the distribution device , is configured to:
receive information regarding the tracking target file from the information processing device; and
generate a tracking result of the tracking target file based on the information regarding the tracking target file that is received.

13. A management device comprising:
a processor, which is configured to:
receive a tracking request for a tracking target file from an information processing device;
transmit the tracking request for the tracking target file to a distribution device of at least one distributor;
receive a tracking result of the tracking target file from the distribution device of the at least one distributor; and
tally the tracking result received from the distribution device of the at least one distributor;
wherein the information processing device comprises:
a processor, which is configured to:
collect attribute information for uniquely identifying each file subject to checking, which has been assigned by a pattern matching file check program, from each file and simultaneously assign, by the pattern matching file check program, the attribute information to a file to which no attribute information has been assigned by the pattern matching file check program, while the pattern matching file check program is checking a file in the information processing device for detecting whether a threat such as a virus is present in the file by using a pattern matching method by matching a pattern file with the file subject to checking, the pattern matching file check program being installed in the information processing device;
receive the attribute information of the tracking target file from the distribution device that distributes the pattern file for detecting the threat in the information processing device;
search for a file associated with the attribute information of the tracking target file that is received; and
transmit, when there exists information regarding the file associated with the attribute information of the tracking target file, the information regarding the file associated with the attribute information of the tracking target file to the distribution device, which is the distributor, and/or perform a procedure on the file associated with the attribute information of the tracking target file.

14. The non-transitory computer-readable recording medium having embodied thereon the pattern matching file check program according to claim 1, wherein the tracking target file is one that has been leaked or has possibly been leaked from a user's computer to the internet due to publication by mistake by the user, an unauthorized operation performed by somebody else, or hacking.

15. The file tracking method according to claim 3, wherein the tracking target file is one that has been leaked or has possibly been leaked from a user's computer to the internet due to publication by mistake by the user, an unauthorized operation performed by somebody else, or hacking.

16. The file tracking method according to claim 6, wherein the tracking target file is one that has been leaked or has possibly been leaked from a user's computer to the internet due to publication by mistake by the user, an unauthorized operation performed by somebody else, or hacking.

17. The information processing device according to claim 10, wherein the tracking target file is one that has been leaked or has possibly been leaked from a user's computer to the internet due to publication by mistake by the user, an unauthorized operation performed by somebody else, or hacking.

18. The distribution device according to claim 11, wherein the tracking target file is one that has been leaked or has possibly been leaked from a user's computer to the internet due to publication by mistake by the user, an unauthorized operation performed by somebody else, or hacking.

19. The management device according to claim 13, wherein the tracking target file is one that has been leaked or has possibly been leaked from a user's computer to the internet due to publication by mistake by the user, an unauthorized operation performed by somebody else, or hacking.

* * * * *